United States Patent

Jorgensen et al.

[11] Patent Number: 6,100,469
[45] Date of Patent: Aug. 8, 2000

[54] ELECTRICAL BOX FOR CEILING FAN SUPPORT

[75] Inventors: Robert W. Jorgensen; Richard D. Swanson, both of Niles, Mich.

[73] Assignee: Hubbell Incorporated, Orange, Conn.

[21] Appl. No.: 09/015,501

[22] Filed: Jan. 29, 1998

[51] Int. Cl.[7] .................................................. H01H 9/02
[52] U.S. Cl. ................................. 174/54; 174/58; 174/61; 174/63; 220/3.2; 220/3.9; 248/906
[58] Field of Search .................................. 174/54, 48, 57, 174/58, 61, 63; 220/3.2, 3.7, 3.8, 3.9; 248/343, 906

[56] References Cited

U.S. PATENT DOCUMENTS

| | | | |
|---|---|---|---|
| Re. 34,603 | 5/1994 | Caison et al. | 174/54 |
| 1,748,693 | 2/1930 | Adell. | |
| 1,800,484 | 4/1931 | Thomas, Jr.. | |
| 1,966,451 | 7/1934 | Le Manquais | 247/22 |
| 2,757,817 | 8/1956 | Egan | 220/3.5 |
| 3,474,994 | 10/1969 | Swanquist | 248/205 |
| 3,724,795 | 4/1973 | Callanan | 248/360 |
| 4,576,302 | 3/1986 | Smolik | 220/3.5 |
| 4,880,128 | 11/1989 | Jorgensen | 220/3.9 |
| 4,892,211 | 1/1990 | Jorgensen | 220/3.2 |
| 4,988,067 | 1/1991 | Propp et al. | 248/343 |
| 5,407,088 | 4/1995 | Jorgensen et al. | 220/3.9 |
| 5,435,514 | 7/1995 | Kerr, Jr. | 248/343 |
| 5,606,147 | 2/1997 | Deschamps et al. | 174/48 |
| 5,677,512 | 10/1997 | Reiker | 174/58 |
| 5,824,952 | 10/1998 | Bordwell et al. | 174/53 |

OTHER PUBLICATIONS

Raco Electrical Products R–192 Complete Line Catalog, No Month 1992, pp. B5, B16, E3, E8.

*Primary Examiner*—Dean A. Reichard
*Assistant Examiner*—Dhiru R Patel
*Attorney, Agent, or Firm*—Jerry M. Presson

[57] ABSTRACT

An electrical box for supporting ceiling fans, the electrical box has a top portion and a side portion extending completely around the top portion and extending substantially perpendicularly to the top portion. The top portion has a substantially planar lower surface, and the side portion has two oppositely spaced tabs extending inwardly toward each other. Each of the tabs has an opening extending completely therethrough. At least one mounting hole is formed in either the top portion or the side portion or the corner formed between the top and side portions. The mounting hole or holes each have a hole axis inclined with respect to the lower surface of the top portion. Each mounting hole extends completely through the wall between an inner cavity of the electrical box and an area outside the wall. The electrical box can have various mounting brackets attached thereto for securing the electrical box to a support member such as a joist or a truss. An electrical box mounting screw is inserted into each mounting hole to secure the electrical box to the support member. The present invention also encompasses a method for modifying an existing fixture supporting electrical box so that it can support ceiling fans.

17 Claims, 4 Drawing Sheets

ELECTRICAL BOX FOR CEILING FAN SUPPORT

FIELD OF THE INVENTION

The present invention relates to an electrical box for supporting a ceiling fan. More specifically, the present invention relates to an electrical box which is rigidly attached to a support member such as a joist or truss, or the like. Additionally, the present invention relates to the method of modifying an existing electrical box that has been attached to a support member and originally intended to support a lighting fixture. Specifically, the method involves modifying the existing electrical box so that it can adequately support a ceiling fan and provide an adequate coupling to the support member.

BACKGROUND OF THE INVENTION

Ceiling fans have become increasingly popular in homes and businesses. With the increasing popularity of ceiling fans came the concern that the dynamic loads of an unbalanced ceiling fan could cause the mounting flanges of the ceiling boxes to flex and eventually break off. This concern lead to code provisions that required ceiling boxes intended to be used as the sole support of ceiling fans to be tested and listed for that use.

As a result, electrical boxes were developed that more securely support ceiling fans and that satisfy the pertinent code provisions and the relevant tests of Underwriter's Laboratories. However, the advancement in this area does not satisfy every need of consumers who desire ceiling fans. Specifically, there remains the problem of electrical boxes that were made and installed prior to the new code provisions, and were not specifically designed to support ceiling fans. These prior electrical boxes are not capable of using the prior electrical box to securely support a ceiling fan. Thus, such prior electrical boxes must be replaced, causing added expense and inconvenience. Additionally, it is expensive for manufacturers of prior electrical boxes to redesign and produce a new product.

Many of prior electrical boxes designed only for lighting fixtures are designed to be mounted to a support member, such as a joist or a truss. With these particular electrical boxes, the problem is three-fold. First, the tabs of the electrical box are not strong enough to support the dynamic loading of the ceiling fan. Second, the box mounting brackets are typically projection welded to the box and cannot stand up to the dynamic loads of ceiling fans. (This is especially true with an out of balance ceiling fan.) Third, the connection between the electrical box bracket and the joist or truss is also deficient. This connection is usually made with nails or staples into the joist or truss.

Examples of some prior electrical boxes are disclosed in U.S. Pat. No. 1,748,693 to Adell; U.S. Pat. No. 1,800,484 to Thomas, Jr.; U.S. Pat. No. 1,966,451 to Manquais; U.S. Pat. No. 3,474,994 to Swanquist; U.S. Pat. No. 3,724,795 to Callanan; U.S. Pat. No. 4,880,128 to Jorgensen; U.S. Pat. No. 4,892,211 to Jorgensen; U.S. Pat. No. 4,988,067 to Propp et al.; Re. 34,603 to Caison et al.; and U.S. Pat. No. 5,407,088 to Jorgensen et al.

Thus, there is a continuing need to provide improved electrical boxes, especially those that can be attached to support members such as a joist or a truss. Additionally, there is a continuing need to provide a method of modifying existing electrical boxes that are intended to be coupled to a support member such as a joist or truss so that they may securely support ceiling fans. This invention addresses these needs in the art as well as other needs which will become apparent to those skilled in the art once given this disclosure.

SUMMARY OF THE INVENTION

One object of the present invention is to provide an electrical box for supporting a ceiling fan.

Still another object of the invention is to provide an electrical box for supporting a ceiling fan that is securely coupled to a support member such as a joist or truss.

A further object of the invention is to provide a method of modifying an existing electrical box for securely supporting a ceiling fan.

Still a further object of the invention is to provide a method of modifying an existing electrical box that is coupled to a support such as a joist or truss for securely attaching a ceiling fan thereto.

The foregoing objects are basically attained by providing an electrical box adapted for ceiling fan support, comprising a top portion having a substantially planar first surface and a perimeter extending completely around the top portion; a substantially annular side portion having a first end secured to the perimeter of the top portion to form a corner edge, a second open end spaced from the first end, and two oppositely spaced tabs extending inwardly toward each other, each of the tabs having an opening extending completely therethrough, the side portion extending substantially perpendicularly to the first surface of the top portion and completely around the perimeter of the top portion, an inner cavity defined by the top portion and the side portion, and extending between the top portion and the second end of the side portion, at least one of the portions having a first hole with a first hole axis inclined with respect to the first surface of the top portion, and the first hole extending completely therethrough between the inner cavity and an area outside the box.

The foregoing objects are also attained by a method of modifying an existing electrical box to meet requirements for supporting a ceiling fan, comprising the steps of obtaining the electrical box to be modified, the electrical box including a top portion having a substantially planar first surface and a perimeter extending completely around the top portion; a substantially annular side portion having a first end secured to the perimeter of the top portion to form a corner edge, a second open end spaced from the first end, and two oppositely spaced tabs extending inwardly toward each other, each of the tabs having an opening extending completely therethrough, the side portion extending substantially perpendicularly to the first surface of the top portion and completely around the perimeter of the top portion, an inner cavity defined by the top portion and the side portion; and drilling a first hole completely through at least one of the portions of the box from the inner cavity to an area outside the box, the first hole having a first hole axis inclined with respect to the first surface of the top portion.

The foregoing objects are further attained by a method of modifying an electrical box, comprising the steps of obtaining the electrical box to be modified, the electrical box including a top portion having a substantially planar first surface and a perimeter extending completely around the top portion; a substantially annular side portion having a first end secured to the perimeter of the top portion to form a corner edge, a second open end spaced from the first end, and two oppositely spaced tabs extending inwardly toward each other, each of the tabs having an opening extending completely therethrough, the side portion extending substantially perpendicularly to the first surface of the top portion and completely around the perimeter of the top portion, an inner cavity defined by the top portion and the side portion; and enlarging the opening of the first tab by drilling completely through the first tab to form a first enlarged opening; drilling a first aperture completely through the top portion, the first enlarged opening and the first aperture being substantially coaxial; enlarging the second opening of the second tab by drilling completely through the second tab to form a second enlarged opening; and drilling a second aperture completely through the top portion, the second enlarged opening and the second aperture being substantially coaxial.

Other objects, advantages, and salient features of the invention will become apparent to those skilled in the art from the following detailed description, which, taken in conjunction with the annexed drawings, discloses preferred embodiments of the invention.

BRIEF DESCRIPTION OF THE DRAWINGS

Referring now to the attached drawings which form a part of this original disclosure.

DETAILED DESCRIPTION OF PREFERRED EMBODIMENTS

Figure 1:
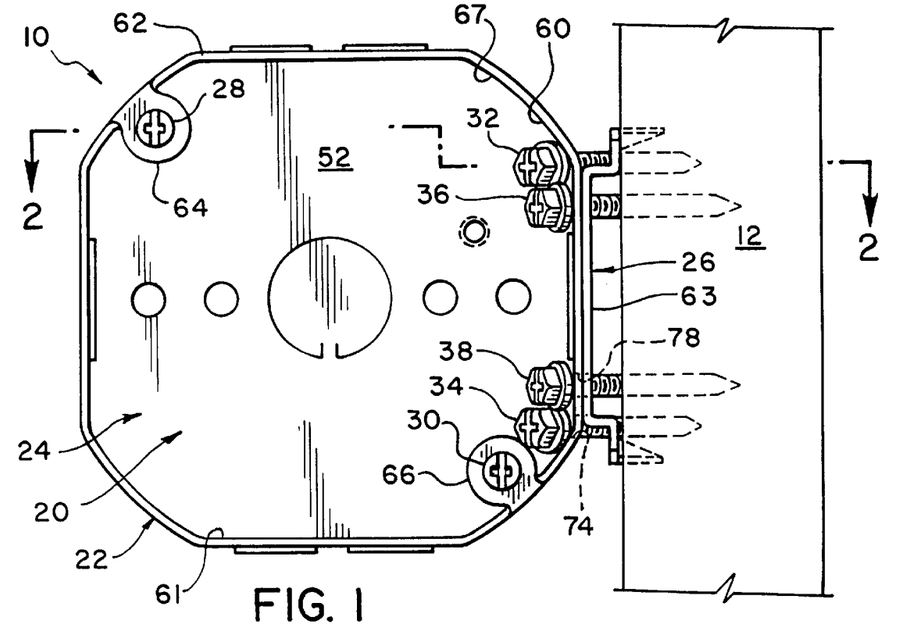
FIG. 1 is a bottom plan view of an electrical box in accordance with a first embodiment of the present invention, attached to a support member such as a ceiling joist.
Figure 2:
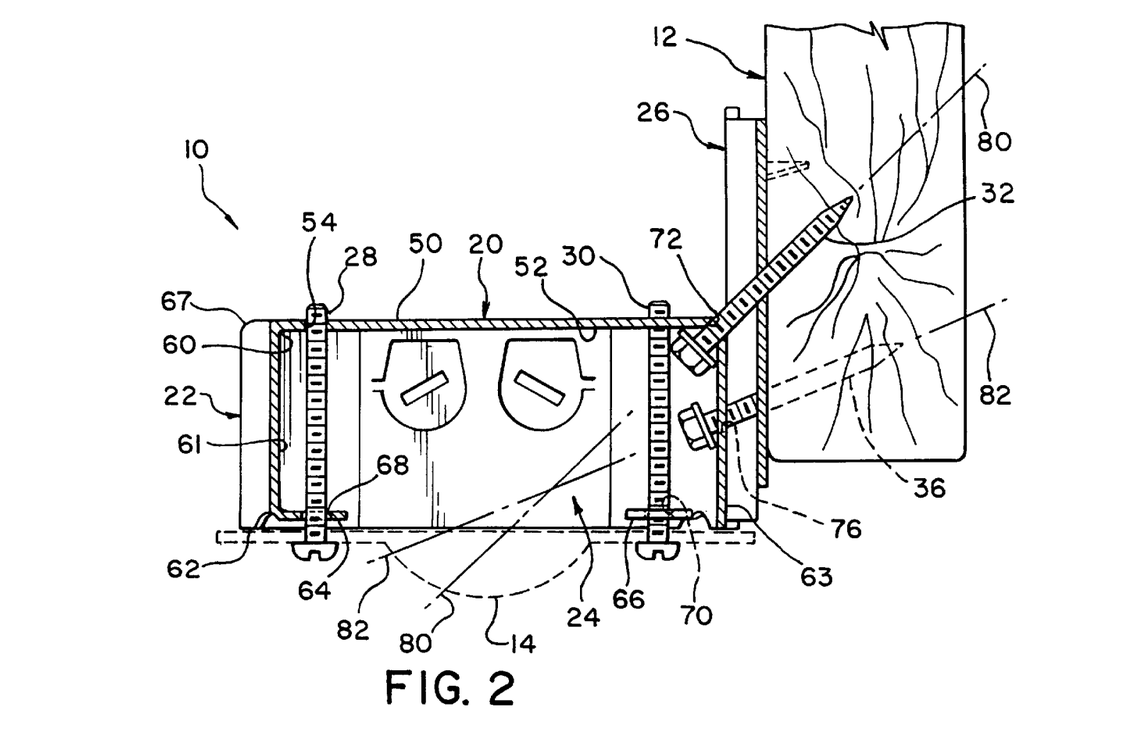
FIG. 2 is a cross-sectional view of the electrical box illustrated in FIG. 1, taken along line 2—2 of FIG. 1.
Figure 3:
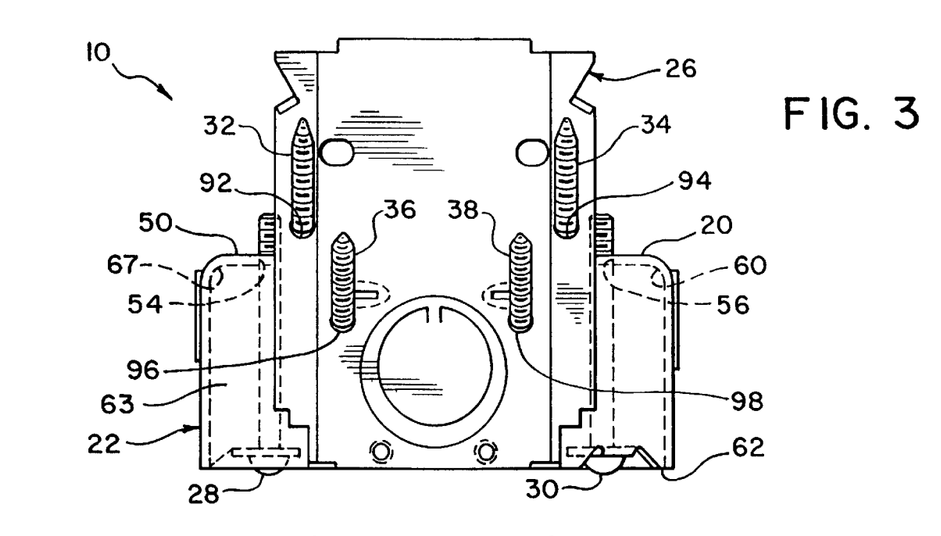
FIG. 3 is a side elevational view of the electrical box in accordance with the first embodiment of the present invention, with the support member removed for purposes of illustration.

Referring initially to FIGS. 1–3, an electrical box 10 in accordance with a first embodiment of the present invention is illustrated. Electrical box 10 is coupled to a support member 12, for example, in the form of a wooden joist or truss. Electrical box 10 provides a secure attachment between a ceiling fan mounting bracket 14 (shown in broken lines in FIG. 2) and electrical box 10 itself, as well as a secure attachment between electrical box 10 and support member 12. As is known in the art, electrical box 10 is preferably formed in a conventional manner from a metallic material, such as steel.

Electrical box 10 has a first wall portion or top portion 20 and a second wall portion or side portion 22. Top portion 20 and side portion 22 define inner cavity 24. A bracket 26 is rigidly coupled to side portion 22 in a conventional manner and to support member 12 by nails or other fasteners (not shown). Ceiling fan mounting bracket 14 is intended to be supported by two fan mounting fasteners 28 and 30 that are securely coupled to electrical box 10. Electrical box 10 is rigidly coupled to support member 12 by a pair of upper mounting fasteners 32 and 34 and a pair of lower mounting fasteners 36 and 38.

Top portion 20 has an upper surface 50, a lower surface 52, and a pair of fan mounting apertures 54 and 56 extending completely through top portion 20. Upper and lower surfaces 50 and 52 are substantially planar and substantially parallel to each other. Fan mounting apertures 54 and 56 are threaded to threadedly receive fan mounting fasteners 28 and 30 as is known in the art, and as disclosed in U.S. Pat. No. 4,892,211 to Jorgensen. U.S. Pat. No. 4,892,211 to Jorgensen is hereby incorporated herein by reference.

Annular side portion 22 extends completely around and downwardly from the perimeter of top portion 20 and is substantially perpendicular to upper surface 50 and lower surface 52 of top portion 20. Side portion 22 has a corner edge 60, or first end 60 a free edge, or second opened end 62, an inner surface 61, an outer surface 63, and two opposing tabs or ears 64 and 66 extending inwardly towards each other.

Corner edge 60 joins with the perimeter of top portion 20 to form an annular corner 67 of electrical box 10. Free edge or lower end 62 is opposite corner edge 60 and is the lowermost portion of electrical box 10. Free edge 62 is also the point which delineates the lowermost portion of inner cavity 24. Tabs 64 and 66 are preferably integrally formed from unitary, one-piece construction with the other parts of side portion 22 as is known in the art. Tabs 64 and 66 extend substantially parallel to lower surface 52 of top portion 20 and substantially perpendicularly to inner surface 61 of side portion 22.

Tabs 64 and 66 are similar to the tabs disclosed in U.S. Pat. No. 4,892,211 to Jorgensen in that each of tabs 64 and 66 has an enlarged opening 68 or 70, respectively. Openings 68 and 70 are aligned with their respective fan mounting apertures 54 and 56 for receiving fan mounting fasteners 28 and 30, respectively. Also, enlarged openings 68 and 70 are preferably through holes that have larger diameters than the diameters of the threaded shafts of fan mounting fasteners 28 and 30. Therefore, fan mounting fasteners 28 and 30 can pass through their respective enlarged openings 68 and 70 and be coupled to top portion 20 as is known in the art. In this manner, fan mounting fasteners 28 and 30 securely fasten ceiling fan 14 to electrical box 10 since they are securely fastened to top 20 instead of tabs 64 and 66.

Fan mounting fasteners 28 and 30 are preferably machine screws. Specifically, fasteners 28 and 30 are preferably 10–32 machine screws that are capable of forming the threads in fan mounting apertures 54 and 56, i.e., self-tapping screws. Further, fan mounting screws 28 and 30 can secure the fan to electrical box 10, while simultaneously tapping the threads in apertures 54 and 56. Fan mounting screws 28 and 30 extend entirely through inner cavity 24 and can be covered with sleeves (not shown) as is known in the art, or a length of the screw can be left unthreaded under the head of the screw to provide a smooth surface.

In order to securely fasten electrical box 10 to support 12, side portion 22 is provided with four holes, two upper holes 72 and 74 and two lower holes 76 and 78. These holes 72, 74, 76 and 78 can be part of the original electrical box 10, or can be drilled as discussed below as a retrofit operation. Each of upper holes 72 and 74 has a hole axis 80 that is centrally located within each respective hole 72 and 74. Likewise, lower holes 76 and 78 each have a lower hole axis 82 that is centrally located within each respective holes 76 and 78. Preferably, hole axes 80 of holes 72 and 74 are substantially parallel. Likewise, preferably, hole axes 82 of holes 76 and 78 are substantially parallel. Holes 72, 74, 76 and 78 are all preferably similarly sized and receive mounting fasteners 32, 34, 36, and 38, respectively.

Upper holes 72 and 74 extend through corner 67 such that their hole axis 80 is inclined with respect to upper and lower surfaces 50 and 52 of top portion 20. Preferably, the inclination of hole axes 80 for holes 72 and 74 is approximately forty-five degrees from lower surface 52. Likewise, lower holes 76 and 78 are preferably inclined with respect to lower surface 52 of top portion 20. Preferably, the inclination of hole axes 82 is less than forty-five degrees from lower surface 52. However, lower holes 76 and 78 can be substantially perpendicular with respect to lower surface 52.

In order to attach electrical box 10 to support 12, it is commonly known in the art to use a mounting bracket, such as bracket 26. As is known in the art, bracket 26 is formed of a metallic material that is preferably similar to that of which top portion 20 and side portion 22 are formed. Bracket 26 can be attached to the other elements of electrical box 10 in many ways. Preferably, bracket 26 is attached by projection welding or spot welding as known in the art. Bracket 26 also has holes 88 through which nails or fasteners are received to secure electrical box 10 to support 12 as known in the art.

In addition to nail holes 88, bracket 26 has a pair of upper apertures or holes 92 and 94 and a pair of lower apertures or holes 96 and 98. These holes 92, 94, 96 and 98 can be part of the original bracket 26 attached to electrical box 10 or be drilled as discussed below as a retrofit operation. Upper apertures 92 and 94 are aligned with upper holes 72 and 74 in side portion 22, and lower apertures 96 and 98 are aligned with lower holes 76 and 78 in side portion 22. That is, the central axes of upper apertures 92 and 94 are collinear with the hole axes 80 of upper holes 72 and 74, respectively. Likewise, the central axes of lower apertures 96 and 98 are collinear with the hole axes 82 of lower holes 76 and 78, respectively.

Each of the holes 72, 74, 76 and 78 of side portion 22 and each of the apertures 92, 94, 96 and 98 of bracket 26 receive one of mounting fasteners 32, 34, 36 and 38 to securely fasten electrical box 10 to support member 12. In particular, fan mounting fasteners 28 and 30 extend through upper holes 72 and 74 and upper apertures 92 and 94, respectively, and lower mounting fasteners 36 and 38 extend through lower holes 76 and 78 and lower apertures 96 and 98, respectively. In this way, electrical box 10 is directly coupled to support member 12.

Preferably, mounting fasteners 32, 34, 36 and 38 are screws that can be screwed into support member 12 to transfer the support of ceiling fan 14 from the welds between side portion 22 and bracket 26 to screws 32, 34, 36, and 38. In other words, fasteners 32, 34, 36 and 38 basically bypass bracket 26 such that the weight and vibration of ceiling fan 14 is directly transferred from electrical box 10 through fasteners 32, 34, 36 and 38 to support member 12. More specifically, screws 32, 34, 36, and 38 are preferably No. 10 sheet metal screws that are 1½ inches long.

Although four screws 32, 34, 36, and 38 are illustrated, the number and placement of the mounting screws such as 32, 34, 36, and 38 and their respective holes and apertures in electrical box 10 can be varied. For example, only the two upper screws 32 and 34 can be employed at corner 67. In which case lower holes 76 and 78 and lower apertures 96 and 98 are not necessary. Also, various numbers of screws, such as three, can be employed. By using three screws, for example, two upper screws 32 and 34 can be employed at corner 67 and a single lower screw can be employed, spaced from upper screws 32 and 34 and positioned to form a triangular orientation between the three screws.

Modification of Existing Electrical Box

Figure 4:
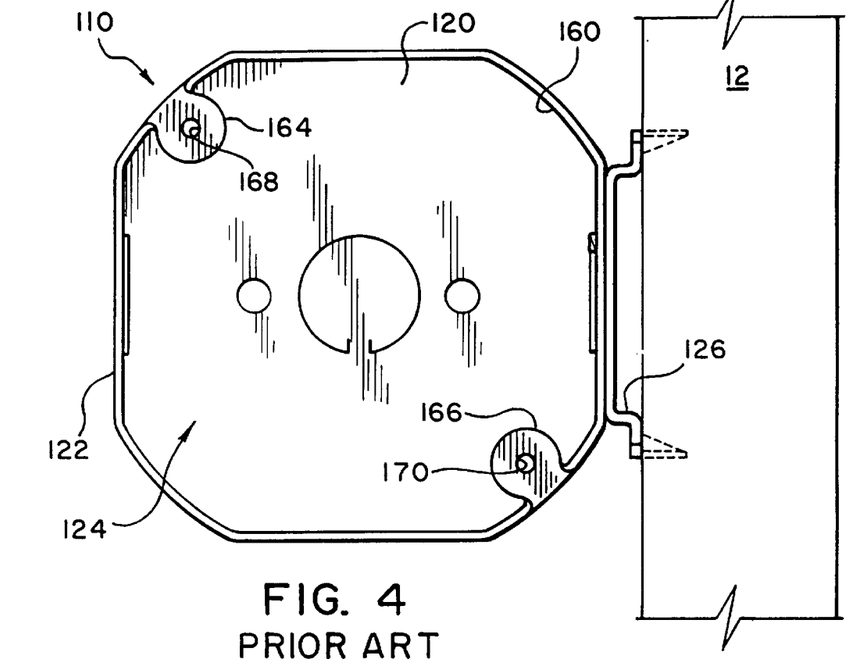
FIG. 4 is a bottom plan view of a prior art electrical box, attached to a support member.

As seen in FIG. 4, a prior art electrical box 110 is attached to support member 12. Electrical box 110 is specifically designed to hold only lighting fixtures as known in the art and is not intended to support ceiling fans. The present invention includes a method of modifying a prior art electrical box such as electrical box 110 so that electrical box could then securely support a ceiling fan.

Since electrical box 110 is known in the art, it will only be described briefly. In fact, after being modified as discussed below, the electrical box 110 is substantially identical to electrical box 10, as discussed above. Basically, electrical box 110 has a top portion 120 and a side portion 122 that extends around the entire perimeter of top portion 120. Both top portion 120 and side portion 122 define an inner cavity 124. Electrical box 110 also has a bracket 126 that is secured to side portion 122 for coupling electrical box 110 to support 12. Bracket 126 is typically welded by a conventional method to side portion 122. Typically, electrical box 10 is attached to support 12 by nailing bracket 126 thereto as is known in the art.

Side portion 122 has two tabs or ears 164 and 166. Tabs 164 and 166 have small threaded openings 168 and 170, respectively, that are sized to receive light fixture mounting screws (not shown). Light fixture mounting screws typically extend from a light fixture and thread into small threaded openings 168 and 170 to secure the light fixture to electrical box 110. The structure of electrical box 110 is such that the potential connection between electrical box 110 and a ceiling fan, i.e., tabs 164 and 166, and the connection between electrical box 110 and support member 12, i.e., welding and nails, are not of sufficient strength to support the dynamic loads of a ceiling fan.

In accordance with the present invention, prior art electrical box 110 can be modified to securely support a ceiling fan. This is accomplished by performing two tasks on electrical box 110 that transform electrical box 110 into electrical box 10 as illustrated in FIGS. 1–3. The first task is to strengthen the connection between the ceiling fan and electrical box 110 and the second task is to strengthen the connection between side portion 122 and support member 12. It should be understood that these two tasks can be performed in any order and can also be performed prior to, or while the electrical box, is attached to support member 12.

Figure 5:
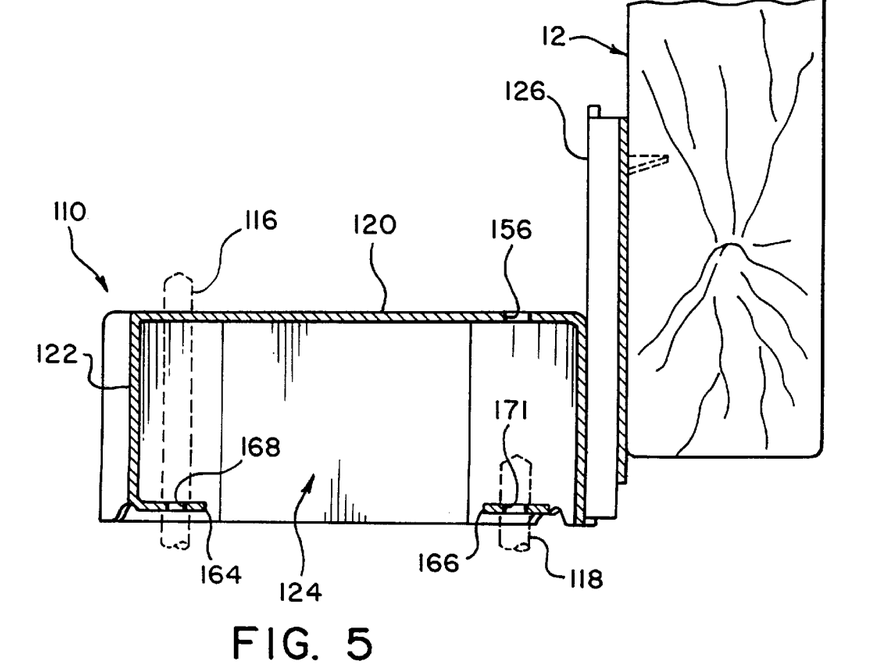
FIG. 5 is a cross-sectional view of a prior art electrical box that has been partially modified in accordance with the present invention as seen by the dashed lines illustrating the application of two different sized drill bits used to modify the electrical box.

Referring now to FIG. 5, the strengthening of the connection between the ceiling fan and the prior art electrical box 110 is accomplished by first enlarging small openings 168 and 170 and forming fan mounting apertures in top portion 120. This is preferably accomplished by drilling out openings 168 and 170 of tabs 164 and 166 with a first drill bit that is larger than the existing small openings 168 and 170 of tabs 164 and 166. The first drill bit 116 should preferably be approximately the root diameter of the fan mounting screws 28 and 30, which will ultimately be inserted through tabs 164 and 166 and then threaded into top portion 120 as explained below. The drilling through tabs 164 and 166 continues through inner cavity 124 and through top portion 120 to form two fan mounting holes or apertures in top portion 120. Each fan mounting hole in top portion 120 being aligned with one of the enlarged openings 168 and 170 in tabs 164 and 166. The first drill bit 116 is then backed out of top portion 120 and the tab 164 or 166 and removed from electrical box 110.

FIG. 5 illustrates the point in the modification of electrical box 110 where small drill bit 116 has enlarged the original opening in tab 166 to form intermediate opening 171 and has formed only one fan mounting aperture 156. Drill bit 116 has been removed from tab 166, and is illustrated in dashed lines where it will next proceed through tab 164, through small opening 168, and through top portion 120 to form an intermediate opening in tab 164 and a second fan mounting aperture in top portion 120. Of course, both tabs 164 and 166 are treated and drilled in a substantially identical manner.

Once the fan mounting apertures are formed by the smaller drill bit, the fan mounting apertures are complete as through holes. However, in order to allow a fan mounting screw to pass cleanly through tabs 164 and 166, a second, larger drill bit 118 is used to further enlarge the intermediate openings formed in tabs 164 and 166 by the smaller drill bit 116. The larger drill bit is, of course, larger than the smaller drill bit, and should be large enough to form enlarged openings in tabs 164 and 166 that allow fan mounting screws to freely pass therethrough without interference. With respect to the length of drill bits 116 and 118, if, for example, electrical box 10 is approximately 1½ inches deep, the smaller diameter drill bit 116 could be 2½ inches or longer, and the larger diameter drill bit 118 could then be less than 1½ inches long. This would ensure that the holes made in electrical box 10 by drill bits 116 and 118 are properly sized.

FIG. 5 also illustrates the next step for tab 166, i.e., the formation of an enlarged opening in tab 166 to freely receive fan mounting screw 30. The larger drill bit 118 is illustrated in dashed lines that proceeds only through tab 166. Once intermediate opening 171 is enlarged, drill bit 118 is withdrawn from electrical box 110 and the step is repeated with the other tab 164. Of course, the drilling of the various apertures and openings can be performed in any sequence.

After both tabs 164 and 166 are drilled through with both drill bits 116 and 118 and both fan mounting apertures are formed in top portion 120, fan mounting screws 28 and 30 are inserted through tabs 164 and 166 and into fan mounting apertures in top 120. Preferably, fan mounting screws 28 and 30 are self-tapping screws which form threads in their respective fan mounting holes.

It should be understood that although intermediate opening 171 and fan mounting aperture 156 are preferably aligned, i.e., have collinear axes, a fan mounting aperture such as aperture 156 can be somewhat misaligned while still being capable of functioning as desired. This is attributed to the enlarged opening in tab 166 to allow for some free movement of mounting screw 30 therethrough. This misalignment capability is true with any tab and mounting flange.

The structure resulting from the first part of the modification is illustrated in FIG. 2 and is similar to the ultimate structure disclosed in U.S. Pat. No. 4,892,211 to Jorgensen which, as previously stated, is incorporated herein by reference. Thus, after the first part of the modification, electrical box 110 would be capable of securely supporting a ceiling fan. However, the deficient connection between bracket 126 and side portion 122 still must be addressed, as discussed below.

Referring again to FIG. 4, since the connection between side portion 122 and bracket 126 is designed for electrical box 110 to support merely a lighting fixture, this connection must also be strengthened. This is accomplished by drilling holes through electrical box 110, including drilling through bracket 126 and into support member 12. Mounting screws are then inserting therethrough. More specifically, preferably two holes are drilled into the corner edge 160 at approximately a 45° angle with respect to side portion 122. The drilling continues through corner edge 160 and through bracket 126 and into support member 12, if electrical box 110 is already attached to support member 12. Thus, the drilling through electrical box 110, bracket 126 and support member 12 can be one continuous operation.

This process is repeated so that there are two parallel holes extending through corner edge 160 and into support member 12. The drilling of those corner edge holes results in upper holes, e.g., holes 72 and 74, and upper apertures, e.g., holes 92 and 94, as illustrated in FIGS. 1–3. Then upper mounting screws 32 and 34 are inserted into their respective holes and apertures and screwed into support 12 as is illustrated in FIGS. 1 and 2. It should be understood that holes 72, 74, 92 and 94 can be substantially perpendicular to side portion 122, with holes 72 and 74 slightly off the corner edge 160, or they can be inclined to any angle with respect to side portion 122. Preferably, holes 72, 74, 92 and 94 are inclined 45° with respect to side portion 122.

The addition of the two upper mounting screws 32 and 34 may be sufficient to securely attach electrical box 110 to support member 12. However, additional mounting screws can be employed to further strengthen the connection between electrical box 110 and support member 12. Specifically, two additional holes may be drilled through side portion 122 spaced away from top portion 120. These two holes may be drilled through side portion 122, through bracket 126, and into support member 12 so that two additional mounting screws may be inserted into the holes and screwed into support member 12.

The final product of this modification is illustrated as electrical box 10 in FIGS. 1–3, which illustrate lower mounting screws 36 and 38 extending completely through side wall 22 and bracket 26 and into support 12. Of course, any number of holes can be drilled in a similar fashion, i.e., through the electrical box including the bracket and into support 12 to secure the electrical box to support 12.

Additionally, the location of the drilling and the location of the subsequent holes and screws can be varied and can occur at any practical location. Further, the order in which the modification of electrical box 110 occurs is, for the most part, not important and each step can occur in any order. For instance, all of the required drilling can be done at one time to increase efficiency. Then, the fan mounting screws 28 and 30 and the other mounting screws 32, 34, 36, and 38 can all be inserted into their ultimate location illustrated in FIG. 2. Alternatively, each screw 28, 30, 32, 34, 36, and 38 can be inserted into its respective holes immediately after the drilling for that hole is completed. Further, the modification and drilling can take place either after electrical box 110 is secured to support member 12, i.e., the bracket 126 is secured only by nails to support member 12, or the modification can take place prior to electrical box 110 being attached to bracket 126 by nailing.

Still further, some of the modifications can take place prior to the electrical box 110 being mounted to support member 12 with the remaining modifications occurring after the electrical box 110 is secured to support member 12. Whatever the sequence of the steps taken, the ultimate structure of a modified electrical box 110 should be similar to that illustrated with respect to electrical box 10 in FIGS. 1–3.

Second Embodiment

Figure 6:
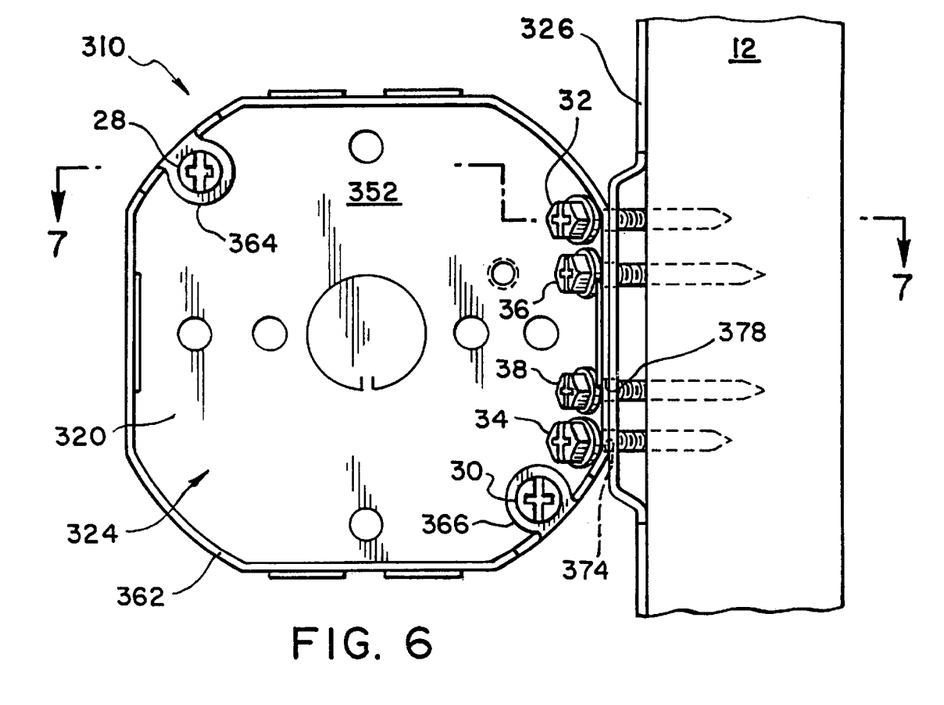
FIG. 6 is a bottom plan view of an electrical box in accordance with a second embodiment of the present invention, attached to a support member.
Figure 7:
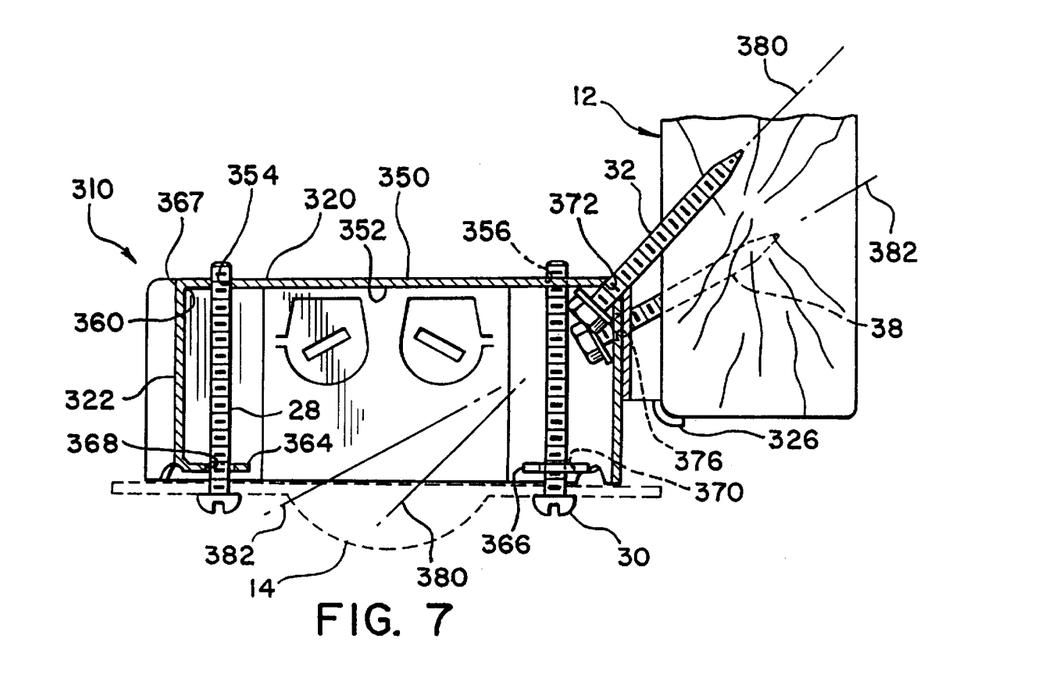
FIG. 7 is a cross-sectional view of the electrical box illustrated in FIG. 6, taken along line 7—7 of FIG. 6.
Figure 8:
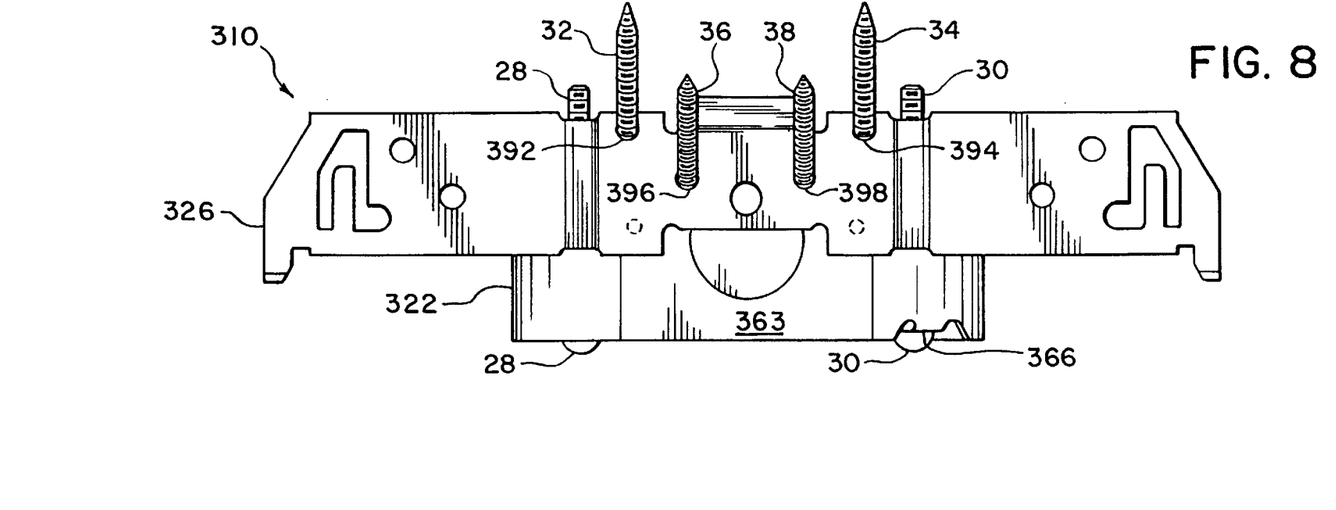
FIG. 8 is a side elevational view of the electrical box in accordance with the second embodiment of the present invention, with the support member removed for purposes of illustration.

Referring now to FIGS. 6–8, an electrical box 310 in accordance with a second embodiment of the present invention is illustrated. Electrical box 310 is substantially identical to electrical box 10, except for the shape and size of bracket 326 and the location and positioning of lower mounting screws 336 and 338. Therefore, electrical box 310 will not be discussed in detail herein.

Basically, electrical box 310 is coupled to support member 12 in substantially the same manner as electrical box 10, and has a first wall portion or top portion 320 and a second wall portion or side portion 322. A bracket 326 is coupled to side portion 322 and to support member 12. Top portion 320 and side portion 322 define inner cavity 324.

Top portion 320 has an upper surface 350, a lower surface 352, and two fan mounting apertures 354 and 356 for mounting ceiling fan mounting bracket 14 as seen in FIG. 7. Side portion 322 has a corner edge 360, a free edge 362, and outer surface 363 and two tabs 364 and 366. Tabs 364 and 366 have enlarged openings 368 and 370, respectively. Electrical box 310 also has a corner 367 with two, preferably substantially parallel holes 372 and 374 extending therethrough along upper hole axes 380; and two, additional preferably substantially parallel holes 376 and 378 extending therethrough along axis 382.

Bracket 326 is basically known in the art except for the apertures or holes passing therethrough 390, 392, 394, and 396 for the upper and lower mounting screws 32, 34, 36, and 38, respectively. Bracket 326 is welded to side portion 322 in a conventional manner, and is longer than bracket 26 in the direction that is transverse to the direction of the fan mounting screws 28 and 30. Bracket 326 is also shorter than bracket 26 in the direction of the fan mounting screws 28 and 30.

Due to the shape of bracket 326 and its relationship to top portion 320 and side portion 322, the arrangement of mounting screws must be altered from that of electrical box 10. As seen in FIG. 8, mounting screws 36 and 38 are positioned closer to each other than with electrical box 10. Also, as seen in FIG. 7, mounting screws 36 and 38 are closer to mounting screws 32 and 34 and are inclined more with respect to lower surface 352 of top portion 320.

Thus, alternative mounting screw arrangements are permitted and may be necessary depending on the electrical box to be reinforced, and depending on the particular bracket, if any. However, such alternative mounting screw arrangements are sufficient to enable their respective electrical boxes to securely support a ceiling fan.

While advantageous embodiments have been chosen to illustrate the invention, it will be understood by those skilled in the art from this disclosure that various changes and modifications can be made therein without departing from the scope of the invention as defined in the appended claims.

What is claimed is:

1. An electrical box adapted for ceiling fan support, comprising:
   a top portion having a planar first surface and a perimeter extending completely around said top portion;
   a annular side portion having a first end secured to said perimeter of said top portion to form a corner edge with said top portion, a second open end spaced from said first end, and two oppositely spaced tabs extending inwardly toward each other, each of said tabs having an opening extending completely therethrough, said side portion extending perpendicularly to said first surface of said top portion and completely around said perimeter of said top portion,
   an inner cavity defined by said top portion and said side portion, and extending between said top portion and said second end of said side portion,
   said corner edge having a first hole with a first hole axis inclined with respect to said first surface of said top portion, and said first hole extending completely therethrough between said inner cavity and an area outside said box.

2. An electrical box according to claim 1, wherein
at least one of said side portion and said corner edge has a second hole with a second hole axis inclined with respect to said first surface of said top portion.

3. An electrical box according to claim 2, wherein
at least one of said side portion and said corner edge has a third hole with a third hole axis inclined with respect to said first surface of said top portion.

4. An electrical box according to claim 3, wherein
at least one of said side portion and said corner edge has a fourth hole with a fourth hole axis inclined with respect to said first surface of said top portion.

5. An electrical box according to claim 2, wherein
said first hole axis and said second hole axis are parallel.

6. An electrical box according to claim 5, wherein
said side portion has a third hole with a third hole axis inclined with respect to said first surface of said top portion, said third hole extending completely through and being spaced from said corner edge towards said second end of said side portion.

7. An electrical box according to claim 6, wherein
said side portion has a fourth hole with a fourth hole axis inclined with respect to said first surface of said top portion, said fourth hole extending completely through and being spaced from said corner edge towards said second end of said side portion.

8. An electrical box according to claim 5, further comprising:
   a bracket coupled to an outer surface of at least one of said top portion and said side portion with first and second apertures extending completely through said bracket, said first aperture having a first aperture axis that is colinear with said first hole axis and said second aperture having a second aperture axis that is colinear with said second hole axis.

9. An electrical box according to claim 8, further comprising:
   a first fastener extending through said first hole and said first aperture; and a second fastener extending through said second hole and said second aperture.

10. An electrical box according to claim 9, wherein
said first and second fasteners are screws.

11. An electrical box according to claim 9, wherein
said top and side portions are integrally formed as a unitary, one-piece member with said corner edge being a bend between said top and side portions.

12. An electrical box according to claim 11, wherein
said first hole axis is inclined at approximately forty-five degrees with respect to said first surface of said top portion.

13. An electrical box according to claim 12, wherein
said top and side portions are formed of metallic material.

14. An electrical box according to claim 1, further comprising:
   a bracket coupled to an outer surface of at least one of said side portion and said corner edge with a first aperture extending completely through said bracket, said first aperture has a first aperture axis that is colinear with said first hole axis.

15. The electrical box according to claim 1, wherein said annular side portion is collinear with a section of said side portion adjacent to and forming said first hole and said section extends between said top portion and said second open end.

16. The electrical box according to claim 1, wherein said first hole is completely surrounded by a section of said at least one of said side portion and said corner edge, said section being collinear with one of said side portion and said corner edge.

17. An electrical box adapted for ceiling fan support, comprising:

a top portion having a planar first surface and a perimeter extending completely around said top portion;

a annular side portion having a first end secured to said perimeter of said top portion to form a corner edge with said top portion, a second open end spaced from said first end, and two oppositely spaced tabs extending inwardly toward each other, each of said tabs having an opening extending completely therethrough, said side portion extending perpendicularly to said first surface of said to portion and completely around said perimeter of said top portion, an inner cavity defined said top portion and said side portion, and extending between said top portion and said second end of sad side portion, at least one of said side portion and top portion having a first hole with a first hole axis inclined with respect to said first surface of said top portion, and said first hole extending completely therethrough between said inner cavity and an area outside said box, and a first fastener extending through said first hole and having a head with a flat area, said flat area being inclined with respect to a segment of said at least one of said portions, said segment forming said first hole such that during fill engagement of said first fastener in said first hole, only a part of said flat area contacts said at least one portion.

* * * * *